Figure 1:
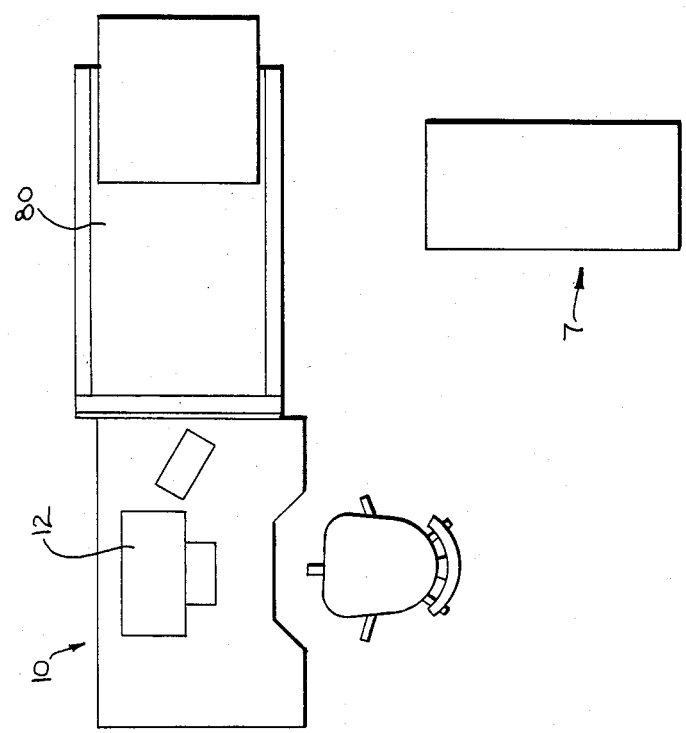
Figure 1:
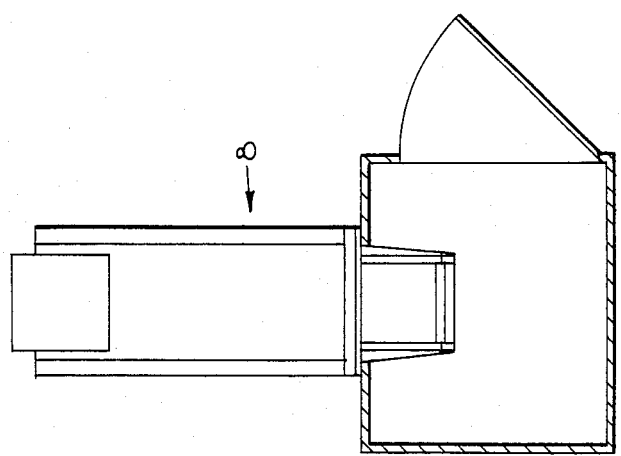

United States Patent [19]

Huss

[11] Patent Number: 4,518,241
[45] Date of Patent: May 21, 1985

[54] INSTALLATION FOR SUPPLYING PHOTOGRAPHIC EMULSION CARRIERS TO A DEVELOPING MACHINE

[76] Inventor: Heinrich Huss, Liebigstrasse 1, 6054 Rodgau 6, Fed. Rep. of Germany

[21] Appl. No.: 499,151

[22] PCT Filed: Sep. 18, 1982

[86] PCT No.: PCT/EP82/00206
§ 371 Date: May 18, 1983
§ 102(e) Date: May 18, 1983

[87] PCT Pub. No.: WO83/01126
PCT Pub. Date: Mar. 31, 1983

[30] Foreign Application Priority Data
Sep. 18, 1981 [DE] Fed. Rep. of Germany ... 8127303[U]
Feb. 18, 1982 [DE] Fed. Rep. of Germany ....... 3205739

[51] Int. Cl.³ ...................... G03D 13/00; G03B 27/58
[52] U.S. Cl. ...................................... 354/319; 355/28; 271/184; 271/225
[58] Field of Search ......................... 355/27, 28, 29, 67, 355/69, 70; 354/319, 320, 321, 322, 312, 316, 307, 88-93; 271/184, 185, 225

[56] References Cited

U.S. PATENT DOCUMENTS

| | | | |
|---|---|---|---|
| 3,308,717 | 3/1967 | Okishima et al. | 355/28 |
| 4,126,391 | 11/1978 | Nishimoto | 355/27 |
| 4,136,946 | 1/1979 | Nishimoto | 355/28 |
| 4,191,369 | 3/1980 | Matsuda et al. | 271/225 |
| 4,260,234 | 4/1981 | Burton | 355/28 |

FOREIGN PATENT DOCUMENTS 2615905 10/1977 Fed. Rep. of Germany.
1542041 10/1968 France.

Primary Examiner—A. A. Mathews
Attorney, Agent, or Firm—Andrus, Sceales, Starke & Sawall

[57] ABSTRACT

An installation, supplying sheets of photographic emulsion carrier into the input slot of a developing machine, is provided for more efficient utilization of the working width of the developing machine, which is equipped with a transfer installation which separates the emulsion carriers, is swivelable about an axis which is perpendicular to the feed direction, is movable along the length of the input slot, and is arranged between an exposure easel, provided with an emulsion carrier feed device, and the input slot.

13 Claims, 6 Drawing Figures

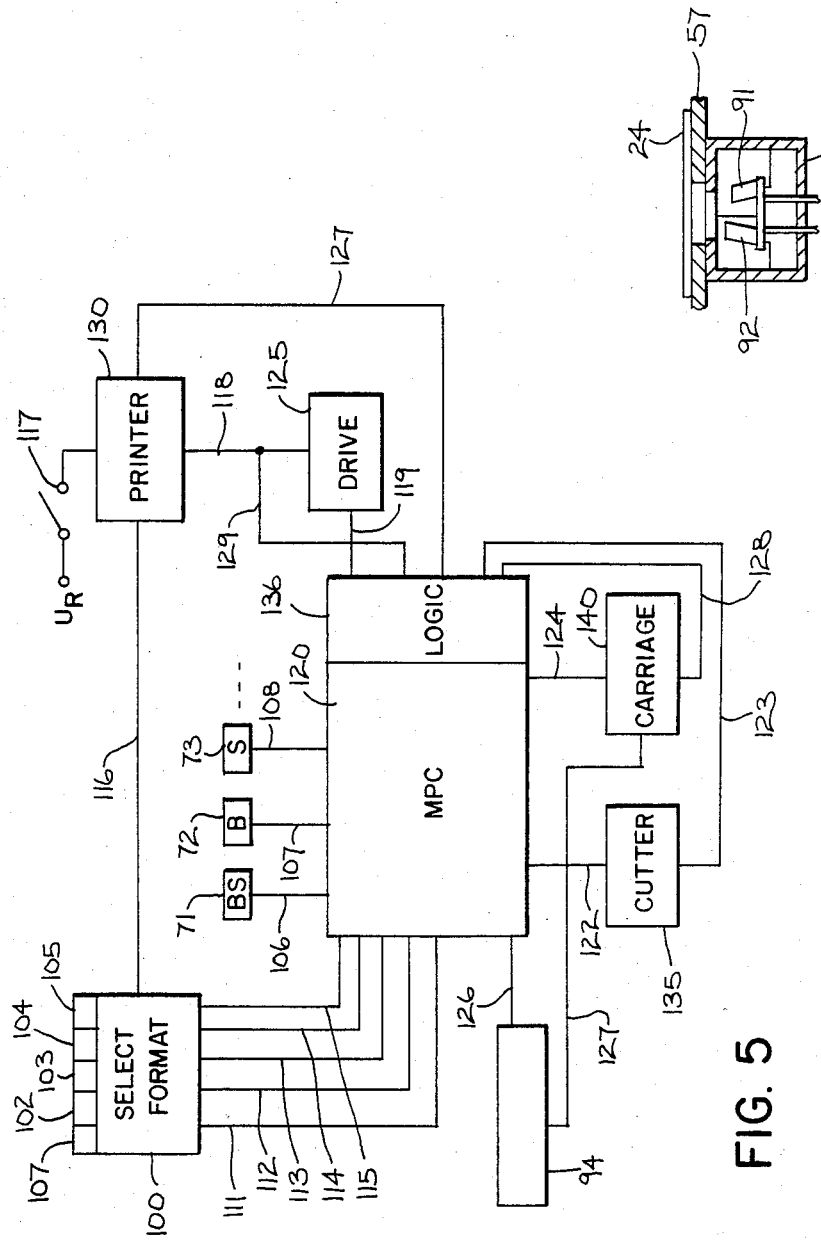

though it is not the subject matter of the

INSTALLATION FOR SUPPLYING PHOTOGRAPHIC EMULSION CARRIERS TO A DEVELOPING MACHINE

The invention relates to an installation for supplying sheets of photographic emulsion carrier into the input slot of a developing machine.

Developing machines, for example of the type described by DE-AS No. 26 15 905, have a relatively large working width for processing wide emulsion carrier webs, so that large format emulsion carriers can also be developed. Furthermore, developing machines have a definite maximum developing capacity, that is, a maximum number of emulsion carriers which can be developed with respect to time, and this number is determined by the time required for the developing and washing procedure and cannot be increased by any given bath composition.

In photographic laboratories which are not fully automated, when working with emulsion carrier webs which are wound on spools, an exposed emulsion carrier spool is suspended intact in the developing machine or input, and then runs continually into the developing machine. Aside from the fact that the transfer of an exposed emulsion carrier web to the developing machine has to be carried out in a darkened area, there is practically no possibility of fulfilling, for example, rush orders, and of running individual photographs through the developing machine on a priority basis, separated from the remaining exposed sections of the emusion carrier web.

Therefore, by using the total working width of the developing machine, it should be possible to run interposed individual photographs through the developing machine in an accelerated manner, despite working with emulsion carrier webs. For this purpose, with an installation for supplying sheets of photographic emulsion carrier into the input slot of a developing machine, a transfer installation is arranged, according to the invention, between an exposure easel which is provided with an emulsion carrier feed device, and the input slot, and this installation separates the emulsion carriers, is swivelable about an axis which is perpendicular to the feed direction and is movable along the input slot. This results not only in the desired, flexible potential, but it also results in an increased total number of developed emulsion carriers per unit of time, without having to increase the time for the emulsion carriers to run through the developing machine.

The invention can be further developed into a mini-laboratory which can be operated in full daylight by having the exposure easel, the transfer installation and the input slot of the developing machine lodged in a light-proof cabinet which is advantageously arranged in front of the front input wall of the developing machine, and on the working surface of the cabinet an illumination station is mounted for film negatives.

Figure 2:
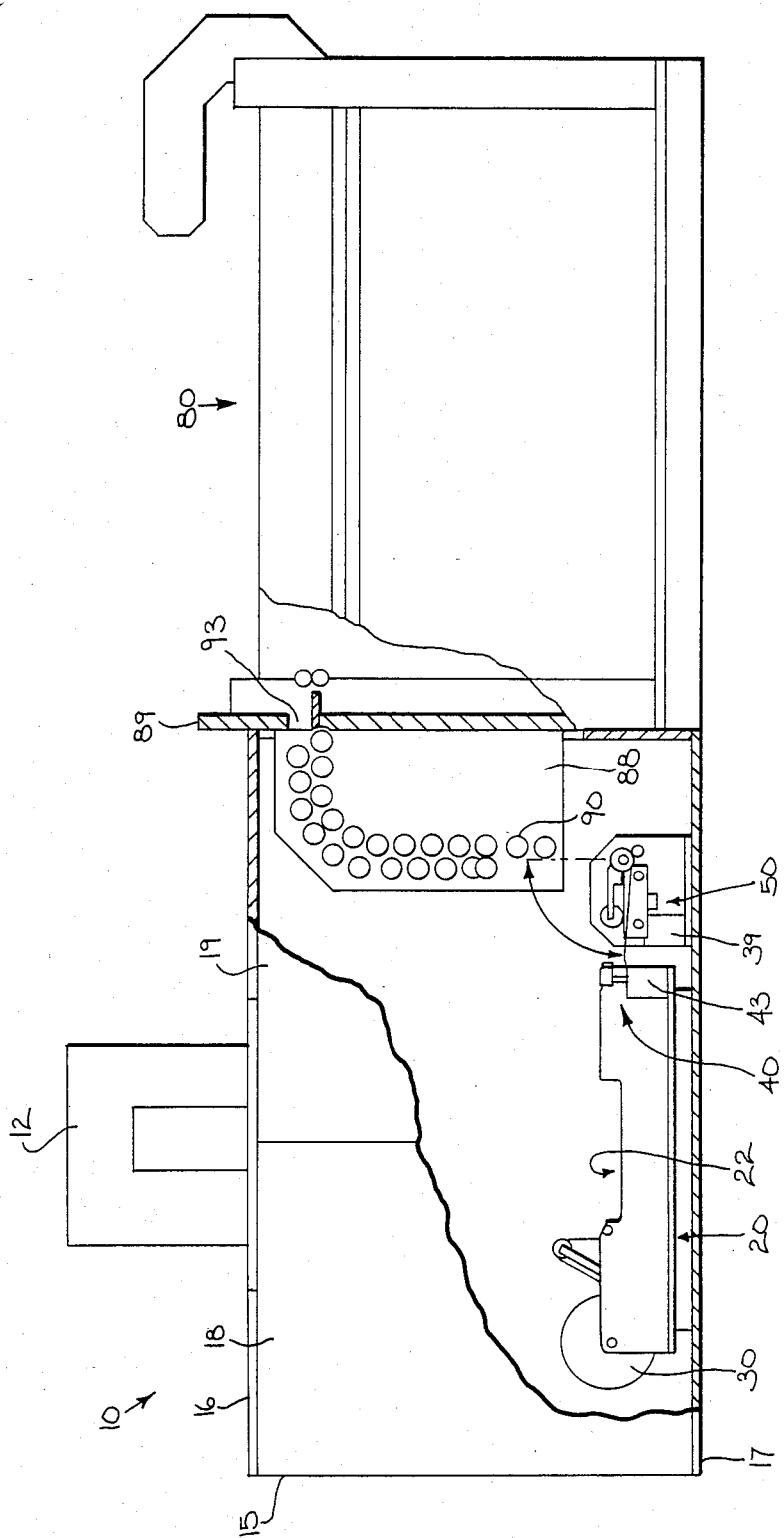
Figure 3:
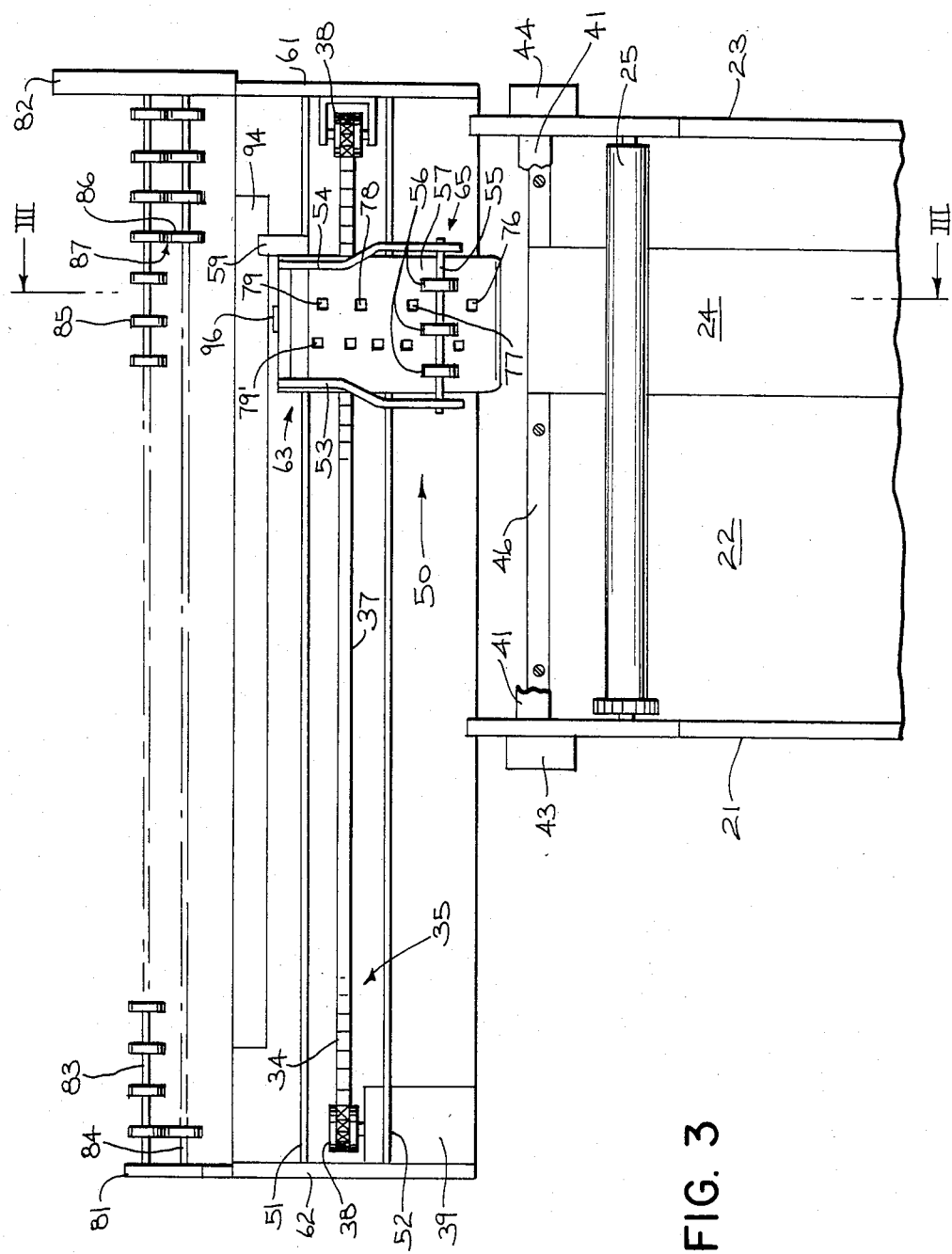
Figure 4:
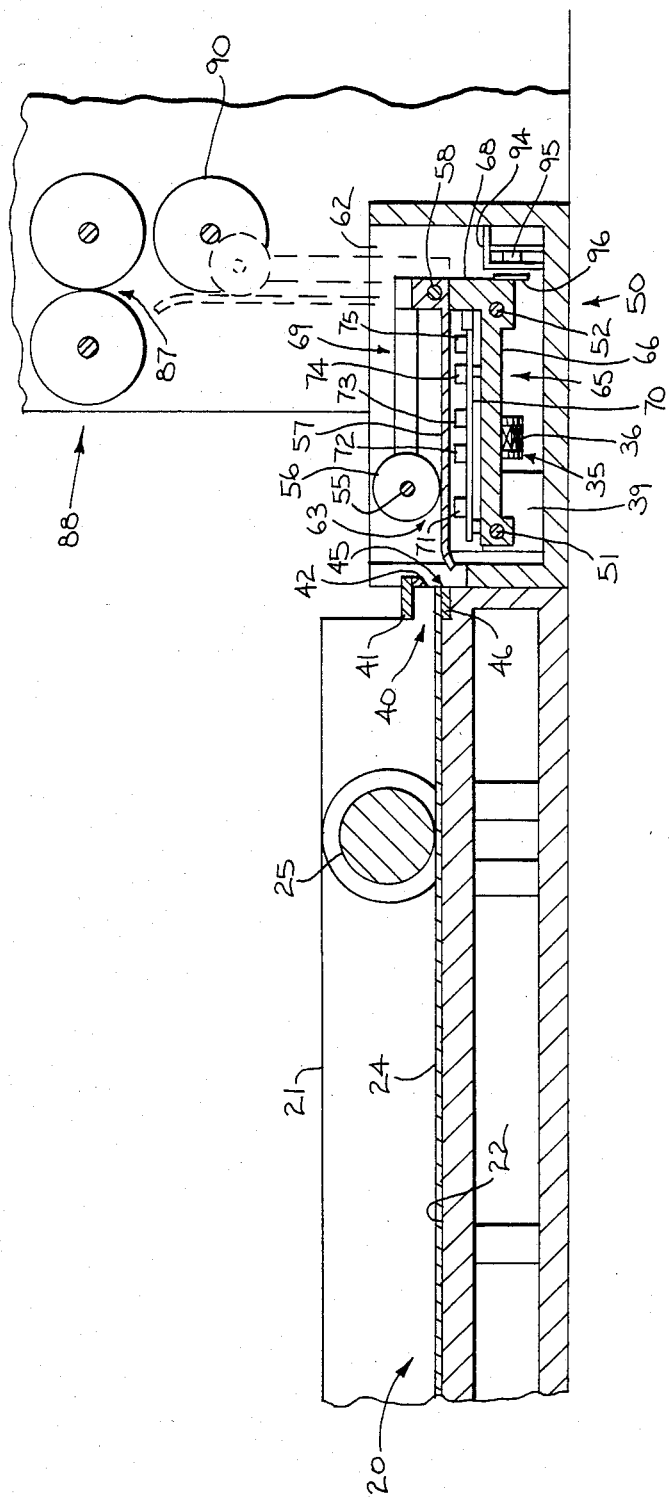

The invention, with its advantageous further developments appears in the following description, in which reference is made to the attached drawings. Shown in the drawings are:

FIG. 1 a schematic illustration of a top view of a mini-photographic laboratory embodying the invention;

FIG. 2 is a schematic side view of an assembly unit composed of a cabinet and developing machine, with partially cut open side walls;

FIG. 3 a schematic top view of the transfer installation with the input slot of the developing machine;

FIG. 4 a sectional view of a portion of the installation along the line III—III from FIG. 3;

FIG. 5 a block wiring diagram explaining the operational technique of the installation;

FIG. 6 a detail from the sliding carriage of the transfer installation.

In essence, the mini-laboratory is comprised of three units, namely a film developing machine wholly described by 8, which is not the subject matter of the invention, a cabinet 10 which is built-on in front of the front side of the developing machine 80, as well as possibly a salescounter 7. The assembly unit, which embodies the invention comprised of a cabinet 10 and developing machine 80, is approximately the height of a table, so that on the upper working surface 16 (FIG. 2) of the cabinet 10 an illumination installation 12, which is only schematically outlined, can be set onto it. The cabinet 10 is sealed off light-proof to the ambient light by means of a side wall 15, a base plate 17 and two front doors 18 and 19, and it contains an illumination station in its interior, wholly described by 20, with a storage spool 30 for a strip of photographic emulsion carrier, as well as with an exposure easel 22 and an integrally built-in cutting installation 40. A transfer installation, wholly described by 50, for emulsion carriers which are cut into sheets by the cutting installation 40, is arranged between the cutting installation 40 and an input installation 88 which is fastened to the input-sided front wall 89 of the developing machine 80 and features an input slot 87 (FIG. 3). Not illustrated are a transparent implacement in the working surface 16 of the table 10 in the exposure area of the illumination installation 12, as well as an image reproducing system that generates a photograph, which is, according to desire, enlarged from the film negative which is illuminated by the illumination installation 12 which is on the working surface 16, on the emulsion carrier which is held in readiness in the exposure easel 22. The distance from the exposure easel 22 to the transparent implacement in the working surface 16 of the table 10 is determined in the usual way according to optical procedures.

The exposure easel 22 possesses the usual means for maintaining the position of the emulsion carrier which is forwarded in the form of a strip, as well as an emulsion carrier feed device, described schematically by 25 in FIG. 3, which can be exemplified by the concretely embodied form of the invention in the form of rolls, strips or similar means which contact the emulsion carrier on one or both sides. The front end of the exposed emulsion carrier 24 illustrated in FIG. 3 protrudes to such an extent into the cutting installation 40, that the front edge of the emulsion carrier 24 terminates with the cutting edge 45 of the cutting bar 46.

The cutting installation 40 features a cutting arm 41 which extends at right angles between the lateral plates 21, 23 at the end of the illumination station 20, and this cutting arm carries a cutting blade 42 on its lower longitudinal edge. The cutting arm 41 which is vertically movable in the lateral plates 21, 23 is connected on each of the two ends with a drive, for example with the anchor of each electromagnet 43, 44. The cutting blade 42 coacts with a cutting bar 46 which is fastened to the end of the extended exposure easel 22 in such a manner that upon activation of the electromagnetic drive 43, 44 the cutting bar 46 travels downward in front of the cutting edge 45 and cuts a sheet of the prepared emulsion carrier 24.

The developing machine 80 possesses a front input wall 89 in which, underneath the working surface 16, an input opening 93 occupies essentially the entire width of the developing machine 80, and this input opening 93 serves for the input of the emulsion carriers which can be up to a width which is defined by the input opening 93. At the outer surface on the cabinet side of the front input wall 89 an input installation 88 is fastened, in which two groups of transporter rollers are fastened to shafts 83, 84 (FIG. 3). Each transporter roller is comprised of several foam plastic disks which are distributed at uniform distances on each of the shafts 83, 84 and which are fastened onto shaft 83, 84. Each shaft 83, 84 spans the entire width of the developing machine 80 and is rotatably supported in the side walls 81, 82 of the input installation 88. The shafts 83 are arranged at a distance from the shafts 84 which allows, according to FIG. 3, slight contact of the oppositely lying foam plastic disks 85, 86. The foam plastic disks 85, 86 which rest on different shafts 83, 84 can, according to FIG. 3, either align in top view and, in lateral view, be arranged between respectively adjacent foam plastic disks (FIG. 2), or alternatively can also, in top view, be arranged between two respectively adjcent foam plastic disks of the other respective shafts. In any case, the arrangement of the transporter rollers is such that a transport path from the input slot 87 to the input opening 93 is provided for an emulsion carrier which is introduced into the input slot 87 whereby the emulsion carrier is transported, on the basis of the drive of at least several transporter rollers, from the input slot 87 to the input opening 93 and from there into the developing machine 80. As FIG. 2 illustrates, the input slot 87 has a fundamentally greater width than the emulsion carrier 24.

In order to utilize the operating capacity resulting from the greater machine width of the developing machine 80 for the relatively narrow emulsion carrier 24, the transfer installation 50 is arranged between the cutting installation 40 and the input slot 87. Between the two side plates 61, 62, which have a distance between themselves which is equal to the width of the input slot 87, two rails 51, 52 are mounted parallel to the input slot 87 and at right angles to the feed direction of the emulsion carrier 24. A sliding carriage 63 rests on the rails 51, 52 and can be displaced in the direction of the arrows c, d and, in addition is coupled with a chain drive 35 in a manner which is yet to be described. In detail, the sliding carriage 63 is comprised of a housing 65 which is open toward the top and toward the exposure easel 22, and a chain 67 is anchored onto the base plate 66 of the housing. The rails 51, 52 penetrate through the borings in the base plate 66. At the upper end of the rear wall 68 a swivel axis 58 is provided, which is fastened to an emulsion carrier plate 57 and a holder 69. The emulsion carrier plate 57 is laterally placed on the non-illustrated lateral walls of the housing 65 and covers the housing 65 at the top in the position illustrated in FIG. 6. The emulsion carrier plate 57 extends, at its end lying opposite to the swivel axis 58, close to the cutting bar 46. The holder 69 has two forks 53, 54 with clearance between themselves, on the front end of which a shaft 55 is supported in a rotatable manner. On the shaft 55 three foam plastic disks 56 are fastened and have diameters such that their peripheries contact the emulsion carrier plate 57 only slightly.

The swivel axis 58 is the output shaft of the stroke drive 59 which is fastened to the rear end of the housing 65. With the activation of the stroke drive 59 the emulsion carrier plate 57, with the holder 69, can be swiveled from the lower end position, illustrated in FIGS. 3 and 4, in which the surface of the emulsion carrier plate 57 aligns with the surface of the exposure easel 22, into a vertical end position swiveled approximately 90° toward the top, and this end position is illustrated in FIG. 2 by dashed lines. In this vertical end position the emulsion carrier plate 57 lies against the driven transporter disks 90, whereby the foam plastic rollers 56 of the holder 69 enter the gaps between the transporter disks 90.

The chain 37 of the chain drive 35 which is connected with the base plate 66 rotates around a pinion 38 which is attached in a rotatable manner at the lateral plate 61 at the inside of the transfer installation 50, and the lower stringer 36 of the chain 37 extends around a drive pinion 38 of a sliding carriage drive motor 39 which is fastened at the oppositely lying plate 62 of the transfer installation 50. The free end of the upper stringer 34 of the chain 37 is again anchored to the base plate 66. The stroke drive 59 and the sliding carriage drive motor 39 are cooperatively activated by means of a control which is yet to be described, so that the sliding carriage 63 moves laterally from the initial position, which is illustrated in FIG. 3 and in which the sliding carriage 63 is ready to accept the front end of the exposed emulsion carrier 24, into a predetermined transfer position, and the emulsion carrier plate 57, with the holder 69, are simultaneously moved from the horizontal end position into the vertical end position and then reversed.

According to FIG. 2, the housing 65 lodges a bed plate 70 which extends parallel to and underneath the emulsion carrier plate 57, when the emulsion carrier plate 57 is in the horizontal end position as illustrated in FIG. 4. Several infrared sensors 71, 72, 73, 74, 75 are connected to the electrical circuit which is imprinted on the bed plate 70, whereby the sensor surface of each sensor is arranged directly underneath an opening 76, 77, 78, 79, 79' in the emulsion carrier plate 57. According to FIG. 6, sensor 71 contains an infrared radiation transmitter 91 and an infrared receiver 92 which is protected from direct irradiation. If a portion of the radiation, which is emitted by the infrared transmitter 91 through the lower side of an emulsion carrier 24 which lies on the emulsion carrier plate 57, is reflected onto the infrared receiver 92, this converts the altered radiation intensity into an electrical signal which is processed by the control in a yet to be disclosed manner. Several sensors 71 . . . can be arranged adjacent to each other and/or behind each other on the bed plate 70 at positions which are determined by the selected format of the photograph which is generated (latent) on the emulsion carrier 24 in the illumination station 20, and by the relative position of the sliding carriage 63 with regard to the illumination station 20. The signals emitted by the infrared receiver 92 are processed in a yet to be disclosed manner by the control in order to activate the cutting installation 40, the sliding carriage drive motor 39, the stroke drive 59 and to release a new exposure procedure in the illumination station 20. The control members for the movement of the sliding carriage 63 are lodged in a control housing 94 which is arranged behind the sliding carriage 63 and extends over a substantial part of the width of the transfer installation 50 between its lateral plates 61 and 62. They essentially consist of sensors which function in the same manner as the sensor 71 (and the sensors 72, 73, 74, 75) of which a sensor 95 is outlined in FIG. 4. The sensors are arranged horizontally in the control housing 94 at distances which are determined by the stopping points of the sliding carriage 63, in front of the input slot 87, which are determined by the selected format. Opposite each sensor, the control housing possesses an opening in front of which a reflector strip 96, which is fastened to the rear wall 68 of the sliding carriage 63, can pass-by when the sliding carriage 63 moves laterally. The signals which are generated by the infrared receivers of the sensors in the control housing 94 are processed by the control in order to activate the sliding carriage drive motor 39 and the stroke drive 59.

The operating mode and the operating technique of the entire installation are explained in the control circuit diagram illustrated in FIG. 5. A format selector 100 provided on the working surface 16 at the tip of the operator's fingers possesses five format selector switches 101 . . . 105 in the illustrated example, so that by pressing one of the format selector switches, one of the formats, for example using a spool width of 9 cm, the formats 9×9, 9×12, 9×13, or using a spool width of 10 cm, the formats 10×10, 10×15 or similar formats, can be selected for the photograph which is to be generated on the emulsion carrier 24 in the illumination station 20.

The format selector 100 controls, corresponding to the engaged format selector switch, the adjustment of the optical system in the illumination station 20. The format selector 100 possesses output leads 111 . . . 115 for each of the format selector switches 101 . . . 105, and these lead to the corresponding inputs of a microprocessor 120. After engaging a format selector switch, the format selector 100 transmits a release signal to the shutter motor 130 of the shutter in the optical system by means of a release lead 16, so that by engaging the release switch 117 the shutter motor 130 can be triggered. Upon terminating the exposure, that is, after closing the shutter in the optical system, the shutter motor 130 transmits a signal by means of a lead 118 to the feed motor 125 of the emulsion carrier feed device 25 which, according to FIGS. 3 and 4, features a drive roller for the strip of emulsion carrier 24 in order that the emulsion carrier 24 is advanced in the direction of the sliding carriage 63. During the advancement, the feed motor 125 transmits a signal by means of a lead 119 to the microprocessor 120, respectively to a gate circuit which is integrated with the microprocessor 120 and wholly described by 135. The microprocessor determines, with a counter, the stopping time-point for the feed motor 125 from the format signal received by means of one of the leads 111 . . . 115 and shuts this down with a stop signal by means of lead 119. Furthermore, the microprocessor 120 stores the format signal and, with it, determines which sensor's 71 . . . 75 output signal can be processed on the leads 106, 107, 108 . . . for the activation of the electromagnets 43, 44 of the cutting installation 40. The microprocessor 120 will release the shutter motor 130 for operation with a signal by means of lead 121 after having generated the first photograph and after having arrested the feed motor 125. Before engaging the release switch 117, another photographic format can be selected by pressing down another format switch, and the other format signal, which is supplied by means of the corresponding output lead 111 . . . 115 to the microprocessor, is stored in the latter for further processing.

The mentioned cycle repeats itself for a period of time until the front edge of the advanced emulsion carrier 24 causes one of the sensors 71 . . . 75, which is appropriated by the initially selected format, to release an output signal to the microprocessor 120. This then shuts down the feed motor 125 by means of a stop signal on lead 119 and triggers the drive 135 of the cutting installation 40 by means of a signal on lead 122. The cutting blade 42 then travels downward in front of the cutting edge 45 and cuts the emulsion carrier (24) format length to correspond to the first photograph. The end of the cutting process is signaled by a signal on lead 123 of the logic circuit 135 which then causes the microprocessor 120 to emit a release signal by means of lead 124 to the sliding carriage drive motor 39 and the stroke drive 59, which are described in FIG. 5 by the carriage drive 140. Meanwhile, the microprocessor 120 has to determine the position at which the sliding carriage 63 must stop in front of the input slot 87 from the initial format signal. The corresponding sensor in the corresponding control housing 94 is activated with a signal by means of lead 126, so that the output signal which is generated, with the by-pass of the reflector strip 96 in front of the corresponding opening in the control housing 94, arrests the carriage drive 140 by means of lead 127. By pressing the emulsion carrier sheet which is taken along by the sliding carriage 63 against the driven transporter roller 90, the emulsion carrier sheet is taken along and introduced into the input slot 87. The sliding carriage then returns (for example after the operating sequence of a timing circuit) into its lower end position as illustrated in FIG. 3. A sensor which is positioned in an appropriate manner in the control housing 94 detects when the sliding carriage 63 has taken on this end position and this is communicated to the microprocessor 120 with a signal by means of lead 128. The microprocessor 120 then starts the feed motor 125 by means of lead 129 and extinguishes the initial format signal from memory. The microprocessor then waits for a signal from one of the sensors, appropriated on the basis of the second format signal. If, for example, sensor 72 is triggered by the emulsion carrier 24, the microprocessor 120 receives the information (for example for an appropriate impulse length) indicating that cutting may not take place now, but that a new photograph can be taken on the emulsion carrier in the illumination station 20. Thereafter, the shutter motor 130 is released by means of lead 121.

Because of the geometry of the installation and the selected format, it can also be the case that a signal from one of the sensors, for example sensor 71, indicates to the microprocessor that cutting as well as a new exposure can take place. In this case the output signals are emitted simultaneously on leads 124 and 121, so that during the transfer of the emulsion carrier sheet into the input slot 87 by means of the sliding carriage, a new photograph can be produced simultaneously.

The previously described control with the microprocessor which contains information for the cutting positions, a memory, a counter, an addressing installation and so on, can be fundamentally simplified and replaced by simple gate logic, as long as one accepts a certain advancement of the emulsion carrier 24 up to the sliding carriage 63 during the format change. The sensors 71 . . . 75 and the sensors which are contained in the control housing can then be directly controlled by the respective format signal on one of the leads 111 . . . 115, whereby the output signals of the respective format dependent activated sensors directly control the feed motor 125, the shutter motor 130 and the carriage drive 140.

Furthermore, it is understood that safety devices for indicating problems can be provided which, for example, interrupt the continued operation of the installation in case an emulsion carrier sheet has not been transferred properly from the transfer installation 50 into the input slot 87.

Therefore, with the installation according to the invention, the emulsion carrier sections can be exposed substantially faster than the speed with which an emulsion carrier passes through the developing machine 80. By passing the laterally displaced emulsion carriers, which are introduced into the input slot 87, through the developing machine 80, the developing capacity of the developing machine is substantially more effectively utilized than before, so that the number of emulsion carriers developed per unit of time can be substantially increased. Furthermore, it is easily possible, with the installation according to the invention, to interpose one or several negatives between a series of negatives which are to be exposed without there being a delay in the development and completion of the photographs which are inserted separately into the series.

I claim:

1. Apparatus for transferring photographic carrier sheets (24) from an exposure easel (22) into an elongate input slot (87) of a developing machine (80) that extends transversely to the direction of feed, comprising:
   a carriage (63) movable along said input slot (87) between an initial position for receiving a carrier sheet (24) from said easel (22) and a predetermined transfer position for transferring a carrier sheet (24) to said input slot (87);
   carriage drive means (140) for moving said carriage (63) between said positions; and
   control means (120) for controlling said drive means (140) to selectively move said carriage (63) to a plurality of transfer positions in response to a preselected carrier sheet format signal.

2. The apparatus of claim 1, wherein said control means (120) includes a plurality of format selector switches (101 . . . 105) for providing a plurality of format signals.

3. The apparatus of claim 1 further including sheet sensor means (71 . . . 75) on said carriage (63) for signalizing to said control means (120) the presence of a carrier sheet (24) thereon, and cutting means (40) responsive to the signal of said sheet sensor means (71 . . . 75) for cutting said carrier sheet (24) to a desired length dependent upon said preselected format signal.

4. The apparatus of claim 3, further including carriage sensor means (95) disposed in spaced relationship along the path of travel of said carriage (63) for signalizing to said control means (120) the presence of said carrier (63) so that said carrier may be stopped at a desired transfer position dependent upon said preselected format signal.

5. The apparatus of claim 3, wherein said carraige (63) includes a carrier receiving plate (57) pivotable about an axis (58) between a first position for receiving a carrier sheet (24), and a second position for transferring said carrier sheet (24) to said input slot (87).

6. The apparatus of claim 5, wherein said axis (58) extends parallel to said input slot (87).

7. The apparatus of claim 6, wherein said input slot (87) is disposed above said pivot axis (58).

8. The apparatus of claim 5, further including feeding means (90) adjacent said input slot (87) for feeding a carrier sheet (24) from said carrier receiving plate (57) to said input slot (87) when said carrier receiving plate (57) is in said second transfer position.

9. The apparatus of claim 5, wherein said carriage (63) further includes holding means (69, 53 . . . 56) for holding a carrier sheet (24) on said carrier receiving plate (57).

10. The apparatus of claim 9, wherein said holding means (69, 53 . . . 56) pivots together with said carrier receiving plate (57).

11. The apparatus of claim 5, wherein said carrier receiving plate (57) includes a plurality of holes (76 . . . 79, 79') formed therein, and said sheet sensor means (71 . . . 75) are disposed beneath said carrier receiving plate (59) in alignment with said holes (76 . . . 79, 79').

12. The apparatus of claim 5, wherein said carrier receiving plate (57) includes a leading edge disposed opposite said pivot axis (58), and said cutting means (40) is disposed adjacent to said leading edge.

13. The apparatus of claim 2, wherein said control means (120) includes a microprocessor.

* * * * *